(12) United States Patent
Korcz et al.

(10) Patent No.: US 11,108,219 B2
(45) Date of Patent: Aug. 31, 2021

(54) ELECTRICAL BOX SEPARATOR

(71) Applicant: Hubbell Incorporated, Shelton, CT (US)

(72) Inventors: Krzysztof W. Korcz, Granger, IN (US); Steven J. Johnson, Buchanan, MI (US)

(73) Assignee: HUBBELL INCORPORATED, Shelton, CT (US)

( * ) Notice: Subject to any disclaimer, the term of this patent is extended or adjusted under 35 U.S.C. 154(b) by 577 days.

(21) Appl. No.: 15/770,646

(22) PCT Filed: Nov. 2, 2016

(86) PCT No.: PCT/US2016/060152
§ 371 (c)(1),
(2) Date: Apr. 24, 2018

(87) PCT Pub. No.: WO2017/079326
PCT Pub. Date: May 11, 2017

(65) Prior Publication Data
US 2019/0058315 A1    Feb. 21, 2019

Related U.S. Application Data

(60) Provisional application No. 62/249,658, filed on Nov. 2, 2015.

(51) Int. Cl.
*H02G 3/00* (2006.01)
*H02G 3/08* (2006.01)
*H02G 3/18* (2006.01)

(52) U.S. Cl.
CPC ............ *H02G 3/086* (2013.01); *H02G 3/08* (2013.01); *H02G 3/083* (2013.01); *H02G 3/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,296,811 A | * | 3/1919 | Keller | H02G 3/086 220/3.92 |
| 3,110,753 A | * | 11/1963 | Witort | H02G 3/0481 174/70 R |
| 3,500,017 A | * | 3/1970 | Zahaykevich | F24H 3/002 392/352 |
| 4,383,692 A | | 5/1983 | Proctor | |
| 4,455,449 A | * | 6/1984 | Rendel | H02G 3/16 174/53 |
| D285,044 S | * | 8/1986 | Mockett | D8/349 |
| 4,800,695 A | * | 1/1989 | Menchetti | E04F 17/08 174/482 |

(Continued)

OTHER PUBLICATIONS

International Search Report and Written Opinion mailed in PCT/US16/60152 dated Mar. 24, 2017.

*Primary Examiner* — William H. Mayo, III
*Assistant Examiner* — Krystal Robinson
(74) *Attorney, Agent, or Firm* — Wissing Miller LLP

(57) ABSTRACT

Electrical box assemblies and electrical box separators are provided. The electrical box assembly includes a box housing having four sides and a bottom and a box separator secured within the box housing and configured to create at least two isolated compartments within the box housing.

22 Claims, 15 Drawing Sheets

(56) References Cited

U.S. PATENT DOCUMENTS

| | | | | |
|---|---|---|---|---|
| 4,967,041 A * | 10/1990 | Bowman | H02G 3/185 | 174/135 |
| 5,069,586 A * | 12/1991 | Casey | A44B 13/007 | 411/339 |
| 5,299,947 A * | 4/1994 | Barnard | G02B 6/4459 | 439/207 |
| 5,486,650 A * | 1/1996 | Yetter | H02G 3/10 | 174/53 |
| 5,594,207 A * | 1/1997 | Fabian | H02G 3/086 | 174/53 |
| 5,686,700 A * | 11/1997 | Carpinella | A47B 21/06 | 174/650 |
| 5,839,594 A * | 11/1998 | Barbour | H02G 3/22 | 220/3.7 |
| 6,018,126 A * | 1/2000 | Castellani | H02G 3/185 | 174/483 |
| 6,147,304 A * | 11/2000 | Doherty | H02G 3/086 | 174/481 |
| 6,218,613 B1 | 4/2001 | Justiniano et al. | | |
| 6,259,020 B1 * | 7/2001 | Ashline | H02G 3/0431 | 174/505 |
| 6,395,981 B1 | 5/2002 | Ford et al. | | |
| 6,414,241 B1 | 7/2002 | O'Donnell | | |
| 6,653,561 B2 * | 11/2003 | Lalancette | H02G 3/081 | 174/50 |
| 7,618,284 B2 * | 11/2009 | Lamoureux | H01R 27/02 | 174/53 |
| 8,436,259 B2 | 5/2013 | Green et al. | | |
| 9,176,531 B1 * | 11/2015 | Hayden | H02G 3/185 | |
| 9,318,888 B1 * | 4/2016 | Baldwin | H02G 3/14 | |
| 9,929,551 B2 * | 3/2018 | Korcz | H02G 3/083 | |
| 10,622,794 B1 * | 4/2020 | Holleschau | H01H 9/0044 | |
| 2009/0014196 A1 * | 1/2009 | Peck | H02G 3/185 | 174/54 |
| 2010/0243315 A1 * | 9/2010 | Shumate | H02G 3/085 | 174/666 |
| 2011/0209913 A1 * | 9/2011 | Green | H02G 3/08 | 174/520 |
| 2012/0305307 A1 * | 12/2012 | Korcz | H02G 3/085 | 174/562 |
| 2013/0062235 A1 * | 3/2013 | Allen | A61B 50/20 | 206/363 |
| 2013/0299208 A1 * | 11/2013 | Moldovan | H02G 3/086 | 174/50 |
| 2014/0374412 A1 | 12/2014 | Rumsey | | |
| 2015/0263496 A1 * | 9/2015 | Sugino | B60R 16/0215 | 174/95 |
| 2015/0282611 A1 * | 10/2015 | Herring | H02G 3/22 | 29/505 |
| 2016/0352087 A1 * | 12/2016 | Wurms | H02G 3/185 | |
| 2017/0163014 A1 * | 6/2017 | Korcz | H02G 3/085 | |

\* cited by examiner

Fig. 7
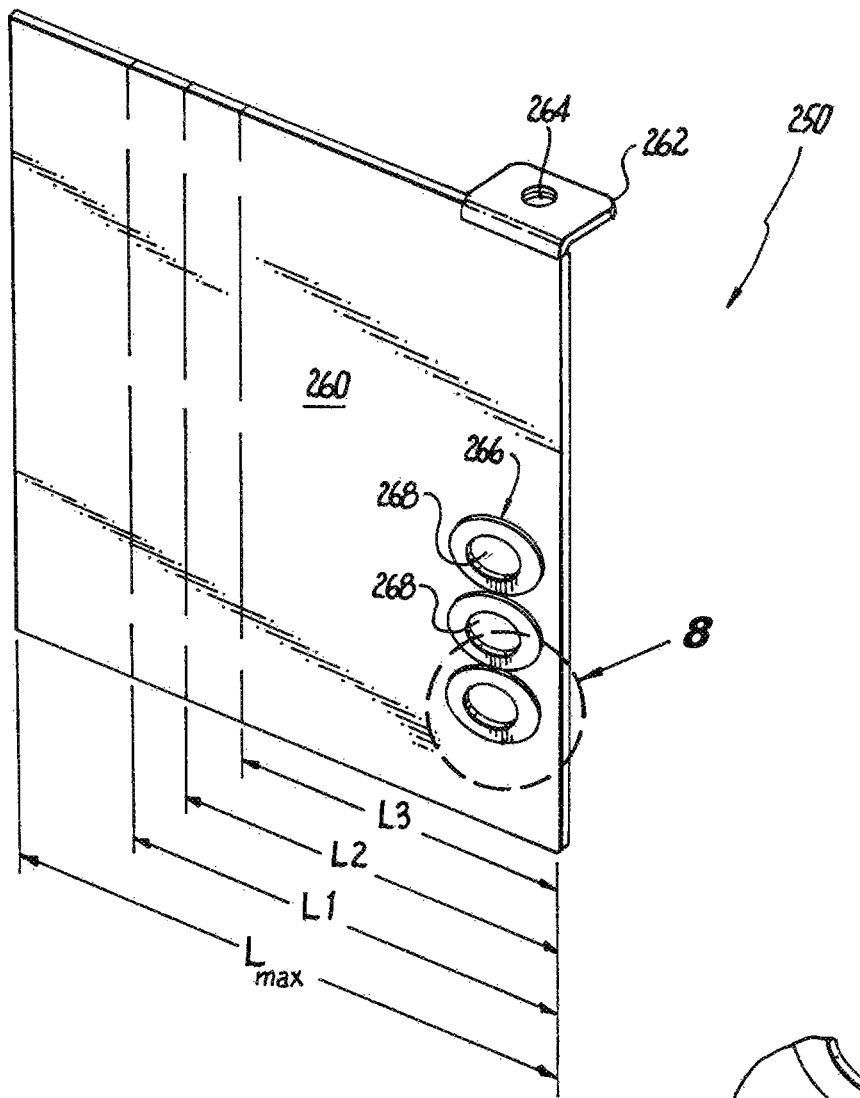
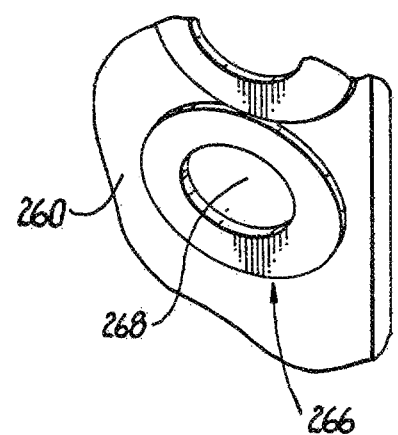
Fig. 8

Fig. 11
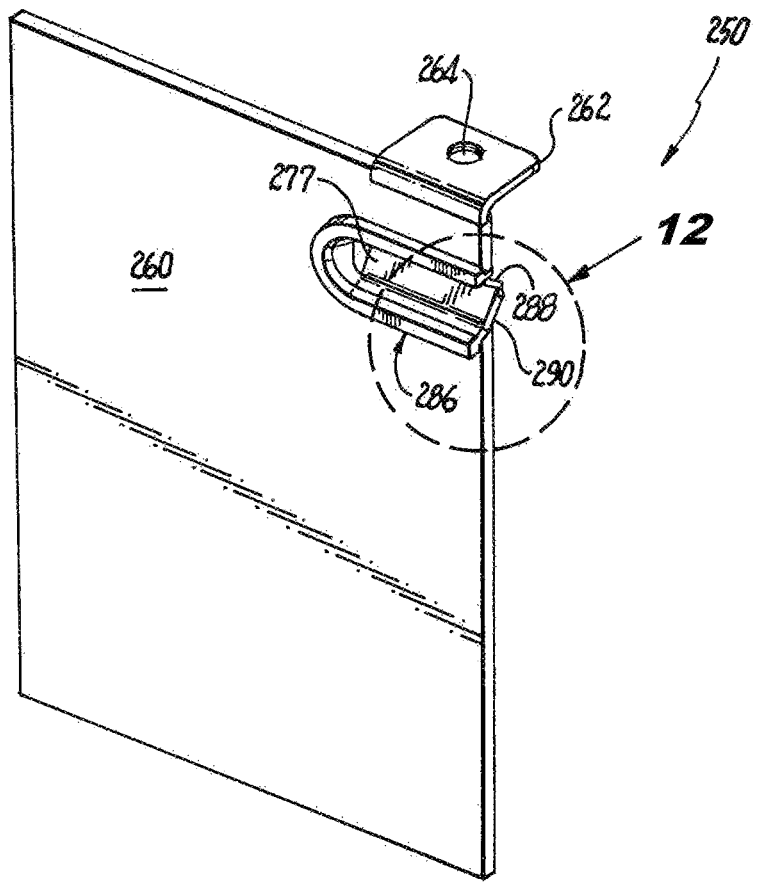
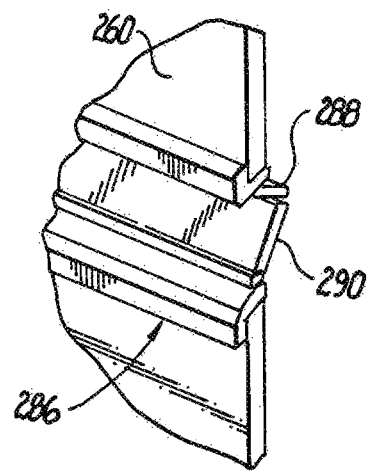
Fig. 12

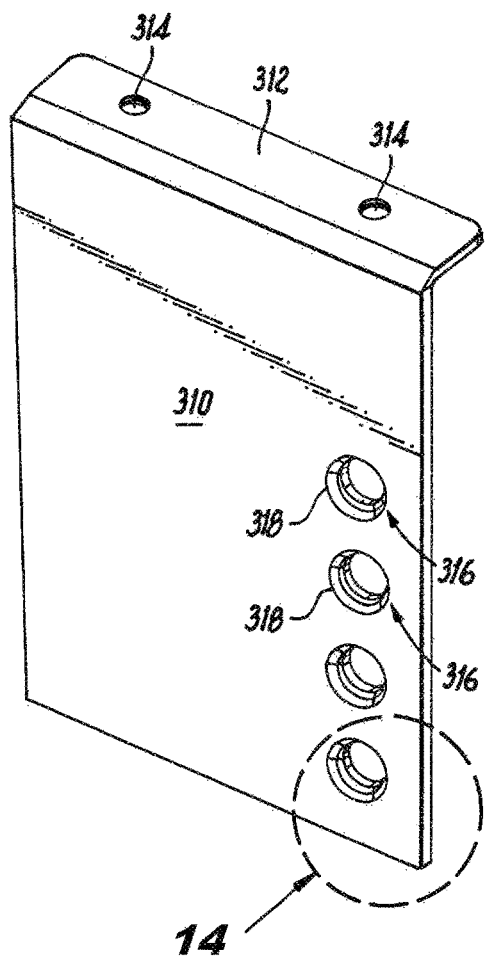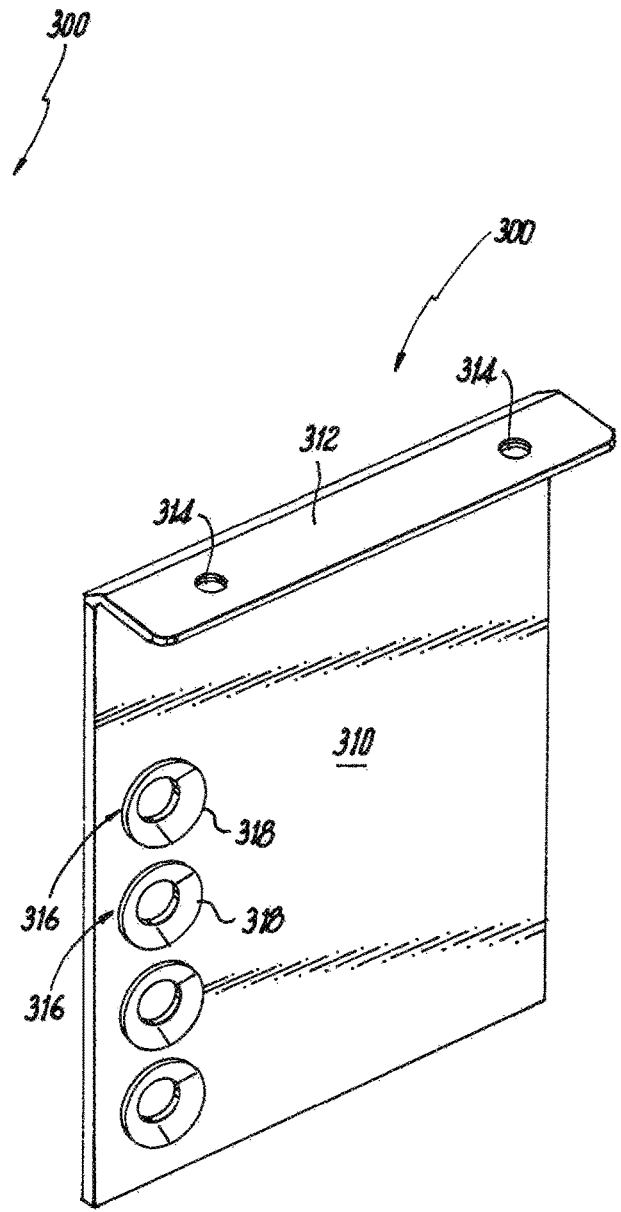
Fig. 13
Fig. 14
Fig. 15

ELECTRICAL BOX SEPARATOR

CROSS REFERENCE TO RELATED APPLICATIONS

The present disclosure is based on and claims benefit from U.S. Provisional Application Ser. No. 62/249,658 filed Nov. 2, 2015 entitled "Electrical Box Separator" the entire contents of which are herein incorporated by reference.

BACKGROUND

Field

The present disclosure relates generally to electrical boxes for electrically conductive cables, and more particularly, to electrical boxes having a separator or divider to permit AC line voltage wire connections and low voltage wire connections to share a common electrical box while being separated by the divider.

Description of the Related Art

Electrical boxes are mounted in various residential, commercial and industrial locations depending on the particular application. Current electrical codes typically require electrical cabling for AC line voltage wiring to be separated from cabling for low voltage wiring, and electrical boxes used for AC line voltage wiring connections to be separated from electrical boxes used for low voltage wiring connections. As a result, electrical cable manufactures developed separate AC line voltage cabling and low voltage cabling. However, that requirement is changing and cable manufacturers are beginning to manufacture electrical cabling that includes wires for AC line voltage transmission and wires for low voltage transmission.

SUMMARY

The present disclosure provides electrical box assemblies and electrical box separators. The electrical box assemblies include a box housing and a box separator. In an exemplary embodiment, the box housing has four sides and a bottom and the box separator is secured within the box housing and configured to create at least two isolated compartments within the box housing.

In an exemplary embodiment, the box separator comprises a first plate having at least one wire passage, a second partial plate, and a connecting wall between the first plate and the second partial plate. In another exemplary embodiment, the box separator comprises a plate having a mounting member used to secure the box separator to the box housing, and at least one opening within the plate forming a passage into each compartment. The at least one opening may come in many forms examples of which are shown and described herein.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 7 is a perspective view of another exemplary embodiment of a box separator according to the present disclosure;

FIG. 8 is an enlarged perspective view of a portion of the box separator of FIG. 7;

FIG. 11 is a perspective view of another exemplary embodiment of a box separator according to the present disclosure;

FIG. 12 is an enlarged perspective view of a portion of the box separator of FIG. 11;

FIG. 13 is a perspective view of another exemplary embodiment of a box separator according to the present disclosure;

FIG. 14 is an enlarged perspective view of a portion of the box separator of FIG. 13;

FIG. 15 is a perspective view of the opposite side of the box separator of FIG. 13;

DETAILED DESCRIPTION

The present disclosure provides descriptions of electrical box separators and electrical box assemblies with reference to specific exemplary embodiments. The specification and drawings are to be regarded in an illustrative sense rather than a restrictive sense. Various modifications may be made thereto without departing from the spirit and scope as set forth in the following claims.

Figure 1:
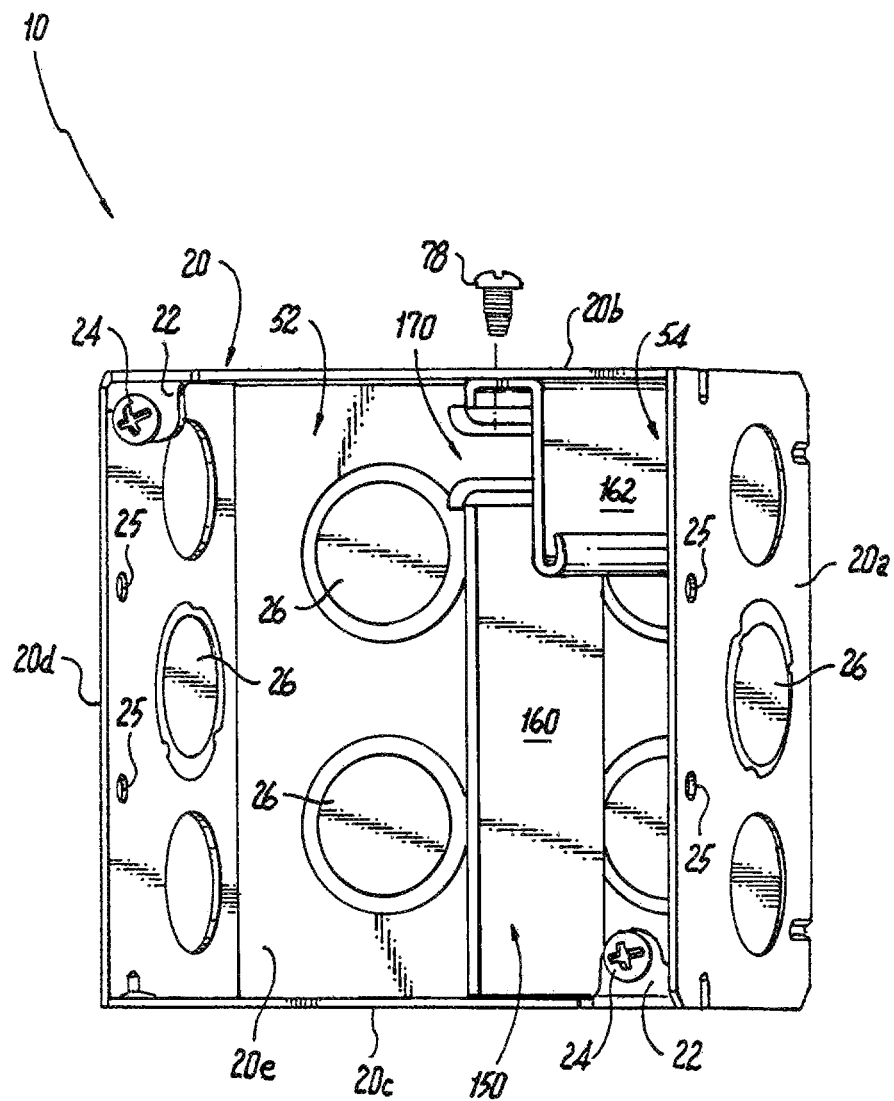
FIG. 1 is a perspective view of an exemplary embodiment of an electrical box assembly according to the present disclosure, illustrating a box housing and a box separator.

Referring to FIG. 1, an exemplary embodiment of an electrical box assembly according to the present disclosure is shown. In this exemplary embodiment, the electrical box assembly 10 includes a box housing 20 having four sides 20a-20d and a bottom 20e, and a box separator 150. The box housing 20 can be fabricated from metal, e.g., steel or galvanized steel, or from non-metallic materials, such as plastic. An example of a suitable plastic material is injection molded thermoplastic. In the embodiment shown, the box housing 20 is a conventional 4×4 square box (or what is also known in the industry as a 4" square box or a 1900 box).

Figure 4:
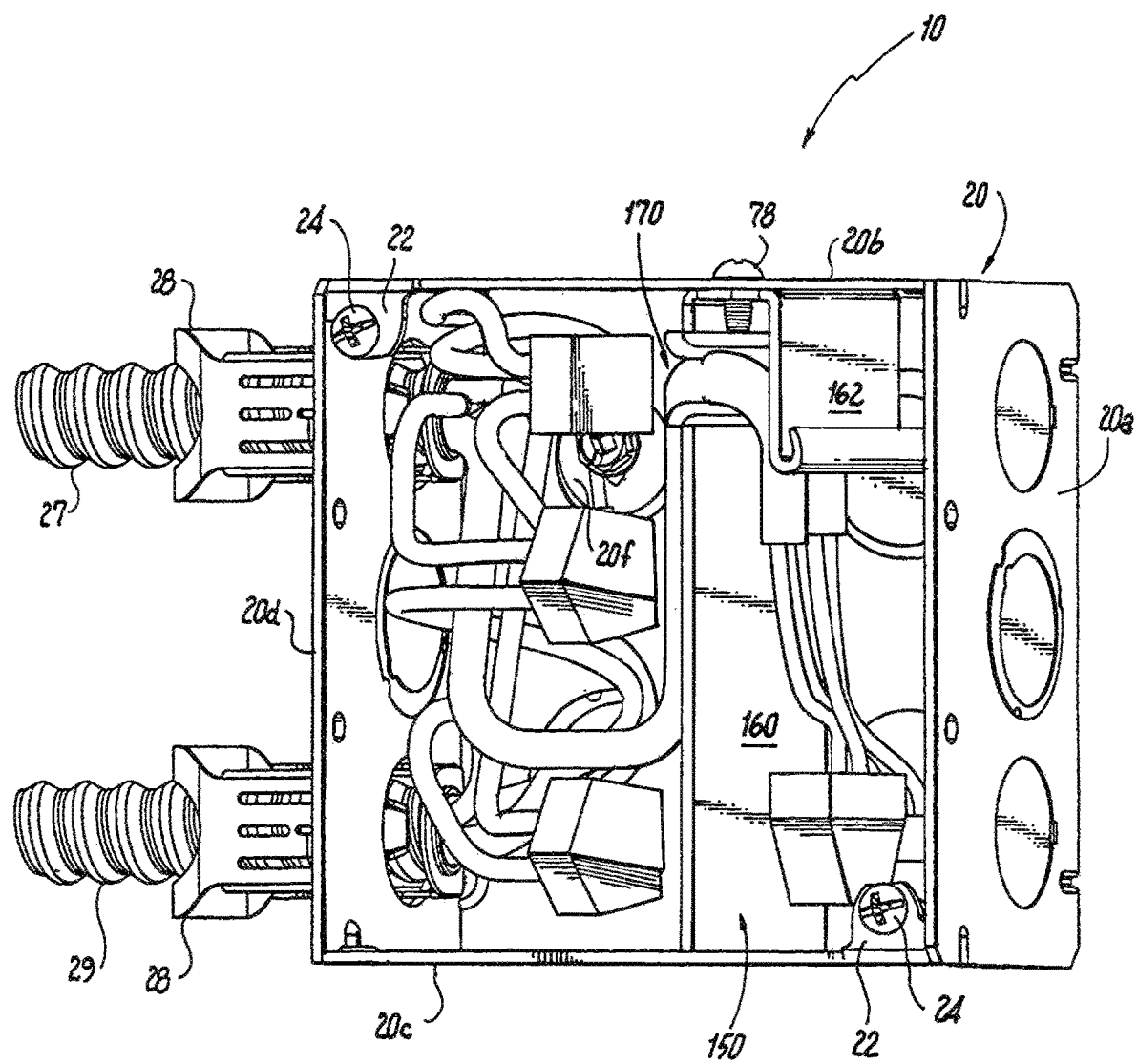
FIG. 4 is a perspective view of the electrical box assembly of FIG. 1, illustrating AC line voltage wire connections in an AC wiring connection compartment and low voltage control wire connections in a low voltage wire connection compartment.
Figure 5:
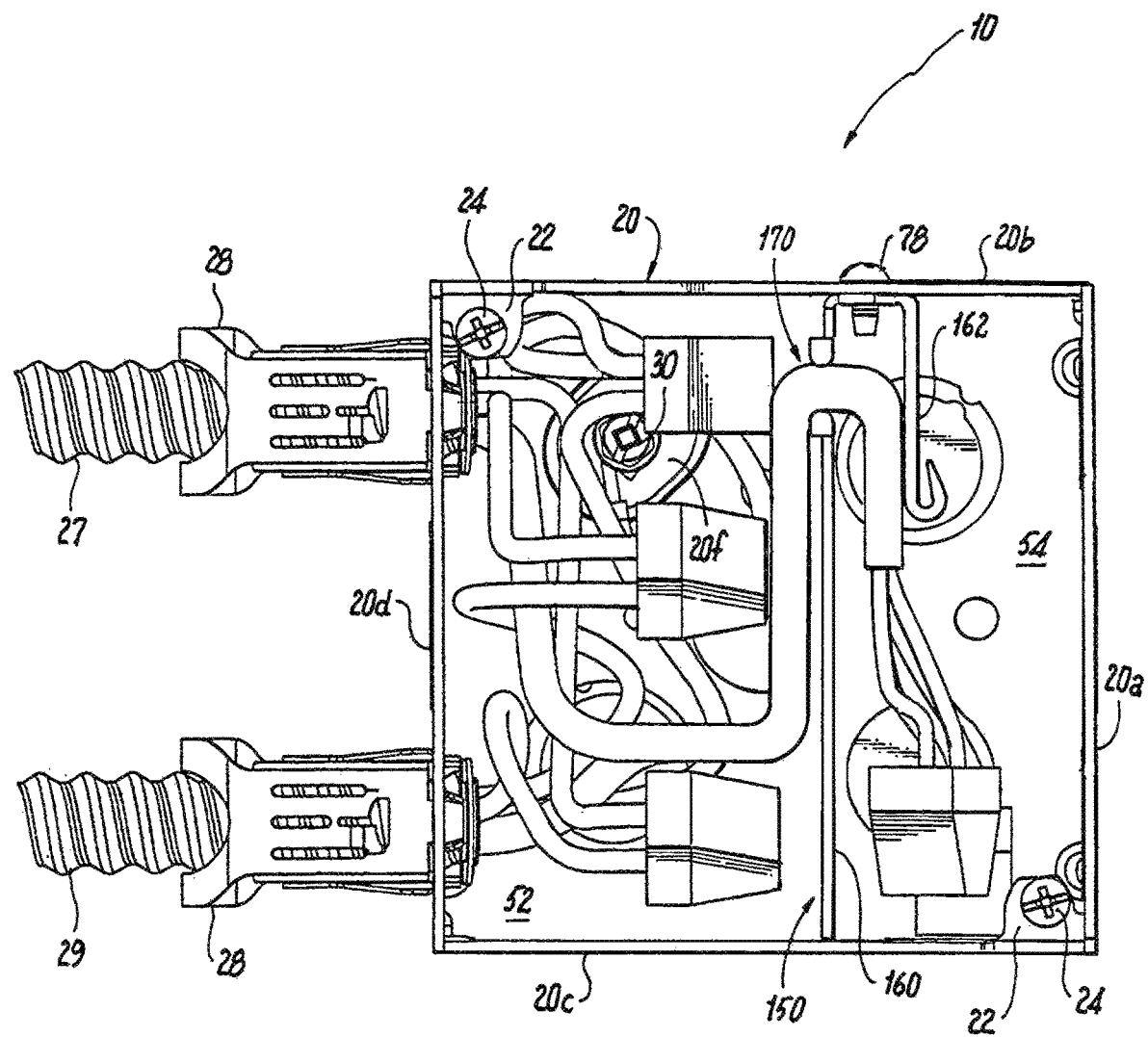
FIG. 5 is a top plan view of the electrical box assembly of FIG. 4.

However any suitable sized electrical box may be used for the present disclosure. For example, additional multi-gang boxes, such as 3 gang boxes or raceways, may be used with the box separator of the present disclosure. Further, the depth of the box housing 20 may vary. For example, the box housing may be 1¼ inches, 1½ inches, 2⅛ inches, or 3½ inches in depth. The box housing 20 may also include one or more mounting members, such as mounting tabs 22, with threaded or tapped mounting holes, where threaded screws 24 (e.g., ⁸⁄₃₂ machine screws) can be inserted to secure a cover, e.g., a blank cover, a switch cover or a receptacle cover, or to secure an extension ring or plaster ring to the box housing 20. The box housing 20 may also include one or more knock-outs 26 used to secure cable clamps 28 (or cable connectors), seen in FIG. 4, to the box housing. The knock-outs 26 can come in many sizes. For example, the knock-outs 26 can be ½ inch, ¾ inch, 1 inch or greater in diameter. To connect the box housing 20 to electrical ground, a ground screw aperture may be included in the box housing 20. In conventional 4×4 electrical boxes, the ground screw aperture is typically on a raised surface 20f of the bottom 20e of the box housing 20, as seen in FIGS. 4 and 5. The ground screw aperture is typically a threaded or tapped hole for insertion of a ground screw, e.g., an ⁸⁄₃₂ machine screw, that is typically color coded as green.

The box separator 150 is secured within the box housing 20, as shown in FIG. 1, to create at least two wiring connection compartments. In the embodiment shown, the box separator 150 creates two wiring connection compartments; an AC wiring connection compartment 52 and a low voltage wiring connection compartment 54. In this exemplary embodiment, as will be described in more detail below, wires or conductors can pass from one compartment to another compartment through one or more wire passages in the box separator. For example, wires can pass from the AC wiring connection compartment 52 to the low voltage wiring connection compartment 54, or wires can pass from the low voltage wiring connection compartment 54 to the AC wiring connection compartment 52.

Figure 2:
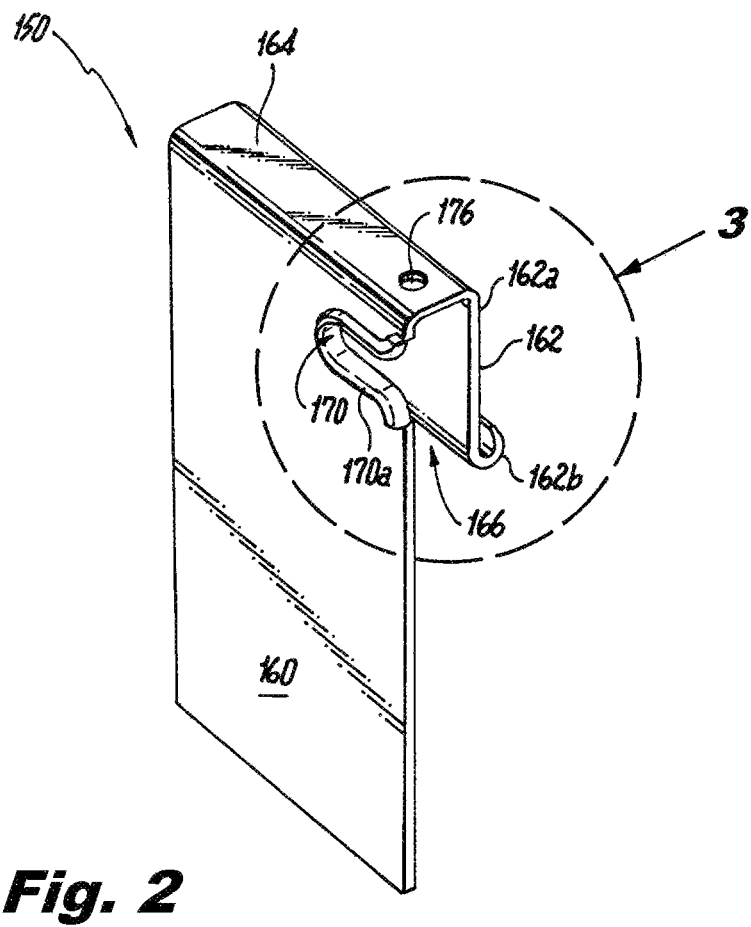
FIG. 2 is a perspective view of an exemplary embodiment of the box separator according to the present disclosure, illustrating parallel dividing plates where one plate is smaller in length then the other.
Figure 3:
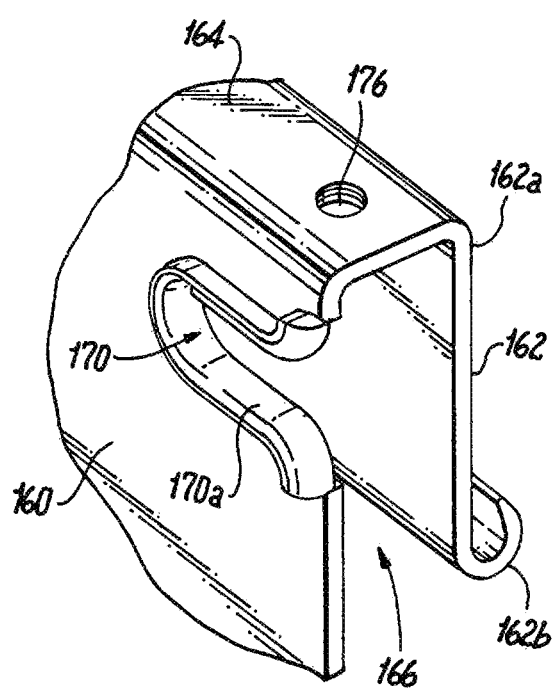
FIG. 3 is an enlarged perspective view of the box separator of FIG. 2, illustrating a wire passage in the box separator.

Referring to FIGS. 1-3, an exemplary embodiment of a box separator 150 according to the present disclosure is shown. The box separator 150 can be fabricated from metal, e.g., steel or galvanized steel, or from non-metallic materials, such as plastic. An example of a suitable plastic material is injection molded thermoplastic. In this exemplary embodiment, the box separator 150 is a U shaped member having two parallel plates 160 and 162 and a connecting wall 164 that form a wire passage channel 166 as shown in FIG. 2. Plate 160 includes a wire passage 170, such as a wire passing slot, an aperture or other opening or passageway, which is configured and dimensioned to allow one or more wires, e.g., AC line voltage wires or low voltage wires, to pass through the plate 160. To prevent potential damage to wires passing through wire passage 170, the edges of the wire passage 170 can include a flange 170a that is rounded to a smooth surface, seen in FIG. 3, so that insulation around wires passing between the AC wiring connection compartment 52 or the low voltage wiring connection compartment 54 and wire passage channel 166 does not become damaged to a point where wire conductors within the insulation become exposed to the environment. In another embodiment, especially when the box separator 150 is made of metal, an insulating sleeve or member (not shown) may be secured to the wire passage 170 by, for example, an adhesive such as glue or epoxy.

Plate 162 is a partial wall having one end 162a extending from the connecting wall 164 and a free end 162b a distance, e.g., about an inch, from the connecting wall that provides access to the wire passage channel 166. To prevent potential damage to wires passing from the AC wiring connection compartment 52 or low voltage wiring connection compartment 54 into the wire passage channel 166, the free end 162b is rounded to a smooth surface, so that insulation around wires passing between the AC wiring connection compartment 52 or the low voltage wiring connection compartment 54, and the wire passage channel 166 does not become damaged to a point where wire conductors within the insulation become exposed to the environment. In another embodiment, especially when the box separator 150 is made of metal, an insulating sleeve or member (not shown) may be secured or attached to the free end 162b of plate 162, by, for example, an adhesive such as glue or epoxy.

Continuing to referring to FIGS. 1-3, to secure the box separator 150 to the box housing 20, the connecting wall 164 includes a threaded or tapped mounting hole 176, and a mounting screw 78, seen in FIG. 1, can be inserted through an aperture in a side wall, e.g., side wall 20a, 20b, 20c and/or 20d, of the box housing 20 into the threaded mounting hole 176, and tightened to secure the box separator 150 to the box housing 20. In other implementations, the box separator 150 can be secured to the box housing by, for example, welding, a spring action snap-in structure, bending mounting tabs in the box housing over corresponding flanges in the box separator, and/or threaded or tapped mounting holes in the bottom 20e of the box housing 20 that are aligned with the apertures in a connecting wall extending between the plates at the bottom of the box separator 150, and inserting threaded screws to the bottom 20e of the box housing 20.

As described above, wires or conductors can pass from one compartment to another compartment. For example and referring to FIGS. 4 and 5, two cables 27 and 29 can be connected to the box housing 20 using cable connectors or cable clamps 28 aligned with pry-outs in the box housing 20, or other cable connectors or clamps in knock-outs 26. In this exemplary embodiment, the one or more cables 27 and 29 can be metal clad power, control, and signal (MC-PCS) type cables with an armored sheathing. Such MC-PCS cables include AC line voltage wires for supplying AC power, and low voltage control or signal wires for controlling devices, such as solid state dimmer switches. Using MC-PCS type cables, low voltage wires in the cable can pass from the AC wiring connection compartment 52 through the wire channel 166 into the low voltage wiring connection compartment 54. As another example, if the cables 27 and 29 can be connected to the low voltage wiring compartment 54 side of the box housing 20, AC line voltage wires can pass from the low voltage wiring connection compartment 54 through the wire channel 166 into the AC wiring connection compartment 52. In another embodiment, one or more cables connected to the box housing 20 can be standard AC line voltage cables, such as 12/2 BX or Romex cables, and one or more cables can be low voltage cables, such as shielded two conductor low voltage control cables. Using separate AC line voltage cabling and low voltage cabling, low voltage wires in the AC wiring connection compartment 52 can pass through the wire channel 166 into the low voltage wiring connection compartment 54. Similarly, AC line voltage wires in the low voltage wiring connection compartment 54 can pass through the wire channel 166 into the AC wiring connection compartment 52.

As noted above, the box housing 20 and box separator 150 can be made of metal or non-metallic materials. In some combinations, the box housing 20 and box separator 150 can be made of the same material, e.g., metal or non-metallic material, and in other combinations the box housing 20 can be made of one material, e.g., non-metallic material, and the box separator 150 can be made of another material, e.g., metal. If the box separator 150 is made of metal or other conductive material, the box separator when connected to electrical ground, by for example mounting tab 74 and threaded screw 78, can provide additional shielding for the low voltage wire connections to help minimize negative effects from AC transients on the AC line voltages within the box assembly 10.

As described above, the box separator 150 may be a U-shaped member. However, the present disclosure contemplates other shapes and configurations of the box separator that creates two or more compartments within the box housing and provide for the passing of wires between the compartments.

Figure 6:
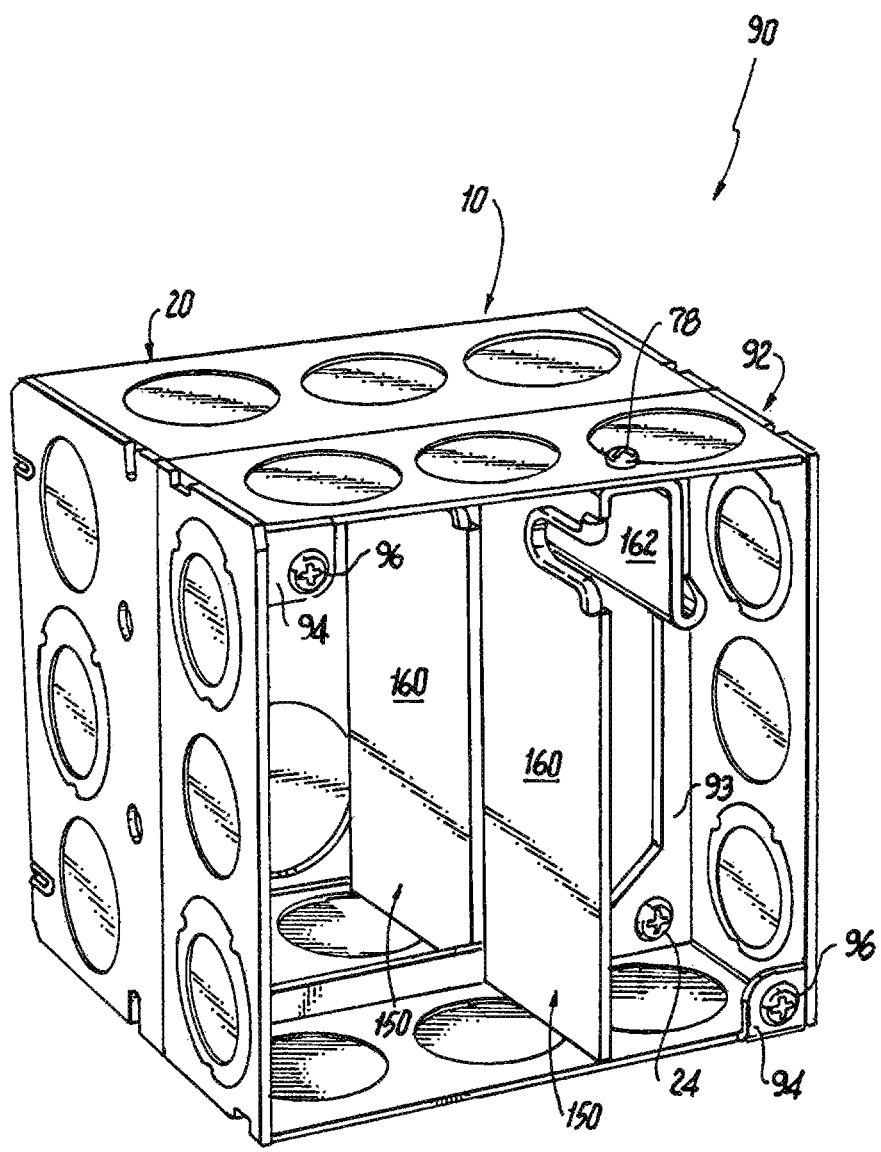
FIG. 6 is a perspective view of another exemplary embodiment of an electrical box assembly according to the present disclosure, illustrating a box housing having a box separator secured within the box housing and a box extension ring secured to the box housing and having a box separator secured within the box extension ring.

Referring to FIG. 6, another exemplary embodiment of the box assembly of the present disclosure is shown. In this exemplary embodiment, the box assembly 90 includes a box assembly 10 as described above having a box housing 20 having a box separator 150, and a box extension ring 92. The box extension ring 92 has four sides 92a-92d and an open bottom surface with a mounting tab 93 that extends around the periphery of the extension ring 92, as shown. To secure the box extension ring 92 to the box housing 20, one or more threaded screws 24 in the box housing 20 can be inserted through apertures in the mounting tab 93 and into the one or more mounting tabs 22 with threaded or tapped mounting holes, described above. A second box separator 150 may be secured to the extension ring 92 in alignment with the box separator 150 secured to the box housing 20, as shown in FIG. 6. In this exemplary embodiment, the depth of the AC wire connection compartment 52 and the depth of the low voltage wire connection compartment 54 may be increased to accommodate a larger number of wires. The box extension ring 92 may also include one or more mounting members, such as mounting tabs 94, with threaded or tapped mounting holes, where threaded screws 96 (e.g., $8/32$ machine screws) can be inserted to secure a cover, e.g., a blank cover, a switch cover or a receptacle cover, or to secure a plaster ring to the box extension ring 92.

Referring now to FIGS. 1 and 7-12, various exemplary embodiments of another box separator configuration according to the present disclosure are shown. In these embodiments, the box separator is a plate having grommets that provide a passage between compartments within a box housing 20. In FIGS. 7 and 8, the box separator 250 is a plate 260 having a mounting member 262, such as mounting tab, extending at a right angle from an upper portion of the plate 260. The mounting member 262 includes a threaded or tapped mounting hole 264, and is used to facilitate the securing of the box separator 250 within the box housing 20. More specifically, a mounting screw, e.g., similar to mounting screw 78, seen in FIG. 1, can be inserted through an aperture 25 in a side wall, e.g., side wall 20a, 20b, 20c and/or 20d, of the box housing 20 into the threaded mounting hole 264 and tightened to secure the box separator 250 to the box housing 20. The box separator 250 can be fabricated from metal, e.g., steel or galvanized steel, or from non-metallic materials, such as plastic. An example of a suitable plastic material is injection molded thermoplastic.

Continuing to refer to FIGS. 7 and 8, the box separator 250 also includes one or more grommets 266 positioned within openings in the plate 260. Each grommet 266 has a solid center knock-out 268 that can be selectively knocked-out to provide an open passage so that one or more wires can be passed through the open center of the grommet 268. The grommets may be made of plastic, such as injection molded thermoplastic, or the grommets may be made of rubber, or the grommets may be made from any other suitable material that can easily be knocked-out and that would protect wires passing through the opening from being damaged. In the example shown in FIGS. 7 and 8, there are three grommets 266, however, one skilled in the art would readily recognize that any number of grommets can be positioned on the box separator in any location to provide wire passages. The diameter of the grommet knock-out 268 may vary. For example, the diameter of the grommet knock-out can be about 0.25 inch, 0.38 inch, etc.

Figure 9:
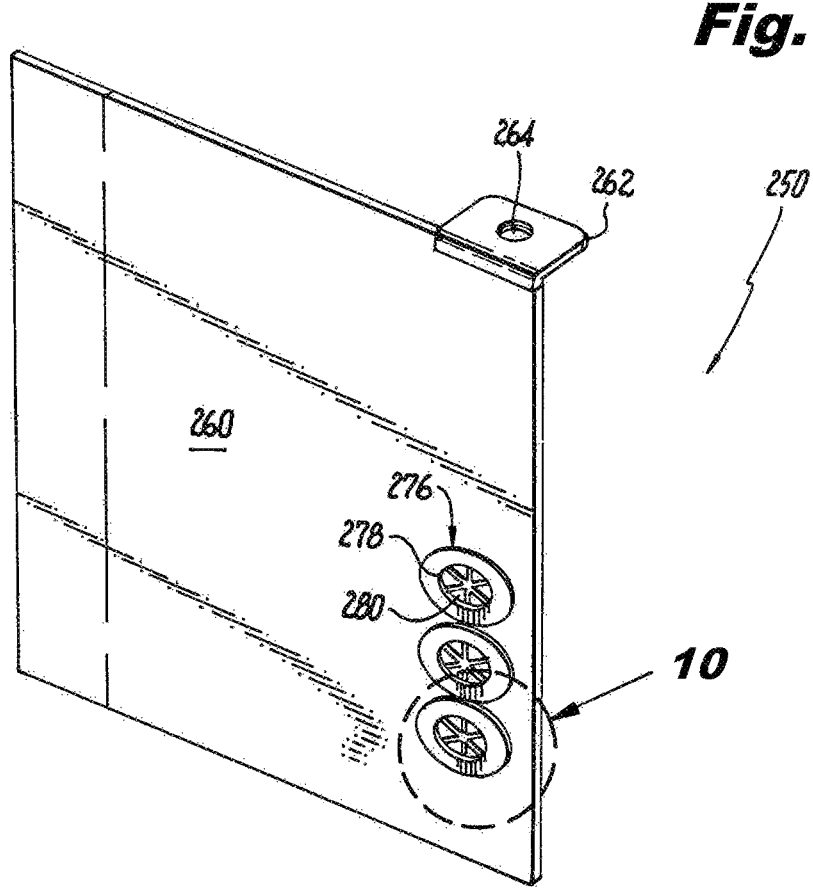
FIG. 9 is a perspective view of another exemplary embodiment of a box separator according to the present disclosure.
Figure 10:
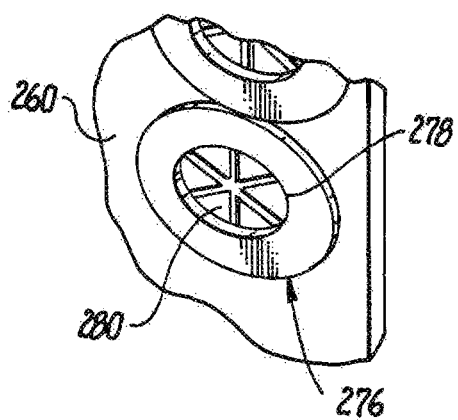
FIG. 10 is an enlarged perspective view of a portion of the box separator of FIG. 9.

Referring to FIGS. 9 and 10, the box separator 250 may include one or more grommets 276 positioned within openings in the plate 260. Each grommet 266 has a center opening 278 and one or more flexible flaps 280 in the center opening to permit one or more wires to pass through the center opening while providing resistance to withdrawal of the wires from the center opening. In the example shown in FIGS. 14 and 15, there are three grommets 276, but one skilled in the art would readily recognize that any number of grommets can be positioned on the box separator in any location. Similar to the grommet of FIGS. 7 and 8, the grommets 276 may be made of plastic, rubber, or any other suitable material that would protect wires passing through the opening from being damaged, and the diameter of the grommet opening 278 may vary. For example, the diameter of the grommet opening can be about 0.25 inch, 0.38 inch, etc.

Referring to FIGS. 11 and 12, the box separator 250 may include one or more grommets 286 positioned within openings in the plate 260. Each grommet 286 has a center opening 277. The grommet 286 is a U-shaped member having two flexible flaps 288 and 290 in the center opening to permit one or more wires to pass through the center opening 277 while providing resistance to withdrawal of the wires from the center opening. However, one skilled in the art would readily recognize that any number of grommets can be positioned on the box separator in any location along an edge of the plate 260. Similar to the grommet of FIGS. 7 and 8, the grommets may be made of plastic, rubber, or any other suitable material that would protect wires passing through the opening from being damaged, and the length of the grommet opening 277 may vary, for example, the length of the grommet opening can be ½ inch, or ¾ inch, etc.

Referring to FIGS. 7 and 9, as noted above, the depth of the box housing 20 may vary. For example, the box housing may be 1¼ inches, 1½ inches, 2⅛ inches, or 3½ inches in depth. To adjust the height of any of the box separators described herein, for example, the box separator 150 or 250, the plate (or plates) may have one or more breakable tabs where the length of the box separator can be set so that the box separator can fit within a box housing having a maximum available depth $L_{max}$ and may include one or more breakable tabs to allow the length of the box separator to be reduced so that the box separator can fit into box housings with narrower depths. For example, in the configuration of FIG. 7, the length of the box separator 250 is set to fit within a box housing having, for example, a depth of 3½ inch such that $L_{max}$ is 3½ inches. If tab 260*a* were removed, the length of the box separator 250 would be reduced to a length L1, which may be for example 2⅛ inches. If tabs 260*a* and 260*b* were removed, the length of the box separator 250 would be reduced to a length L2, which may be for example 1½ inches. And, if tabs 260*a*, 260*b*, 260*c* were removed, the length of the box separator 250 would be reduced to a length L3, which may be for example 1¼ inches.

Turning to FIGS. 1 and 13-15, another exemplary embodiment of a box separator is shown. In this embodiment, the box separator 300 includes one or more openings, such as extruded round holes, as a passageway through the box separator. The box separator 300 can be fabricated from metal, e.g., steel or galvanized steel, or from non-metallic materials, such as plastic. An example of a suitable plastic material is injection molded thermoplastic. The box separator 300 comprises a plate 310 having a mounting member 312, such as a mounting arm, extending at substantially a right angle from the plate 310 and along the width of the plate. The mounting member 312 includes one or more threaded or tapped mounting holes 314 and is used to facilitate the securing of the box separator 300 within the box housing 20. More specifically, a mounting screw, e.g., similar to mounting screw 78, seen in FIG. 1, can be inserted through an aperture 25 in a side wall, e.g., side wall 20*a*, 20*b*, 20*c* and/or 20*d*, of the box housing 20 and into the threaded mounting hole 314 and tightened to secure the box separator 300 to the box housing 20. The box separator 300 also includes one or more openings 316 with flanged edges 318 on each side of the plate to prevent potential damage to wires passing through the openings 316. The diameter of the one or more openings 316 may vary. For example, the diameter of the opening 316 can be about 0.25 inch, 0.38 inch, etc. The diameter of the openings can be the same or they can be different, as one skilled in the art would readily appreciate. As shown in the figures, the openings 316 are positioned along an upper area of the plate 310. However, one skilled in the art would readily recognize that any number of openings 316 can be positioned on the box separator in any location.

Figure 16:
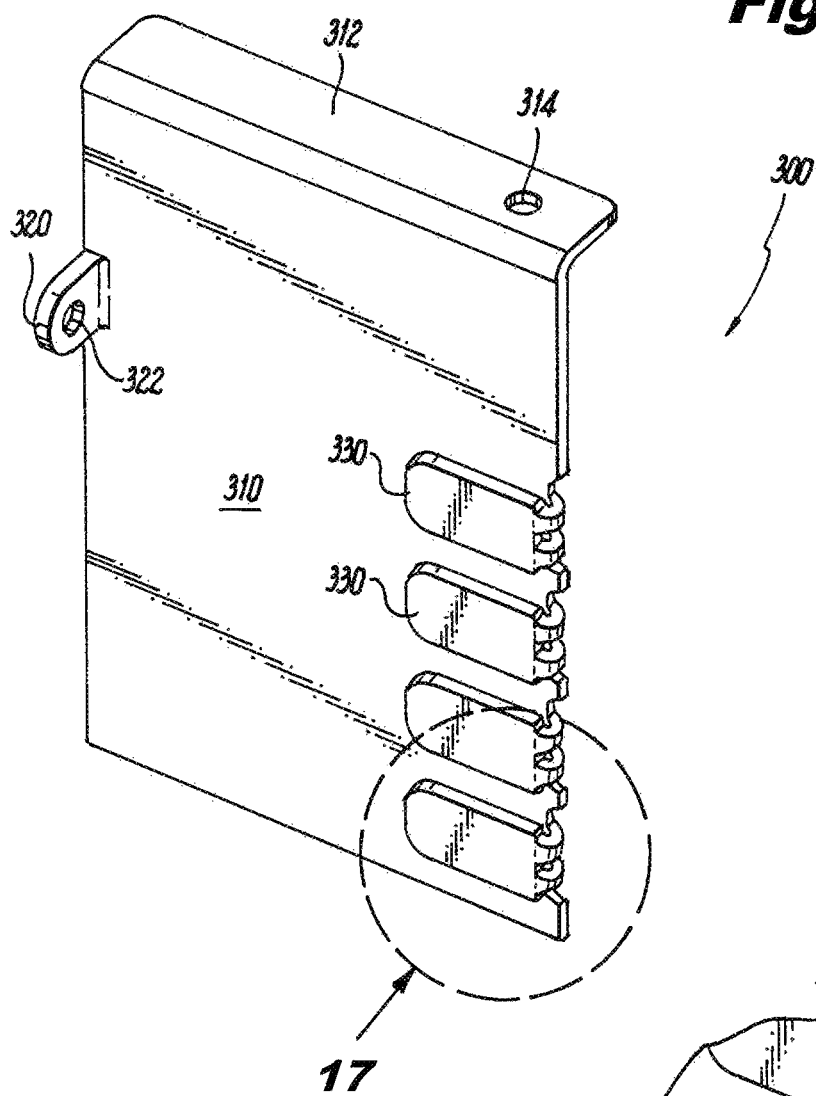
FIG. 16 is a perspective view of another exemplary embodiment of a box separator according to the present disclosure.

FIGS. 16-19 provide another exemplary embodiment of the box separator 300. Similar to the box separator configuration of FIGS. 13-15, the box separator 300 of this configuration is a plate 310 having a mounting member 312 extending at substantially a right angle from the plate 310 and along the width of the plate. The mounting tab 312 includes one or more threaded or tapped mounting holes 314, and is used to facilitate the securing of the box separator 300 within the box housing 20. More specifically, a mounting screw, e.g., similar to mounting screw 78, seen in FIG. 1, can be inserted through an aperture 25 in a side wall, e.g., side wall 20*a*, 20*b*, 20*c* and/or 20*d*, of the box housing 20 into the threaded mounting hole 314 and tightened to secure the box separator 300 to the box housing 20. In addition, the plate 310 may include a second mounting member 320 along a bottom edge of the plate 310, extending from the plate at a right angle, as seen in FIG. 16. The second mounting member 320, e.g., a mounting tab, includes one or more threaded or tapped mounting holes 322, and is used to facilitate the securing of the bottom of the box separator 300 to the bottom 20*e* of the box housing 20. More specifically, a mounting screw, e.g., similar to mounting screw 78, seen in FIG. 1, can be inserted through an aperture in the bottom 20*e* of the box housing 20 into the threaded mounting hole 322 and tightened to secure the bottom of the box separator 300 to the box housing 20. It should be noted that the second mounting member 320 can be used for any embodiments disclosed and/or contemplated herein.

Figure 17:
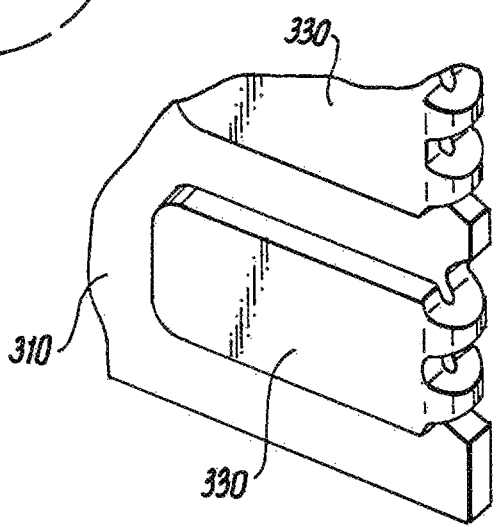
FIG. 17 is an enlarged perspective view of a portion of the box separator of FIG. 16.
Figure 18:
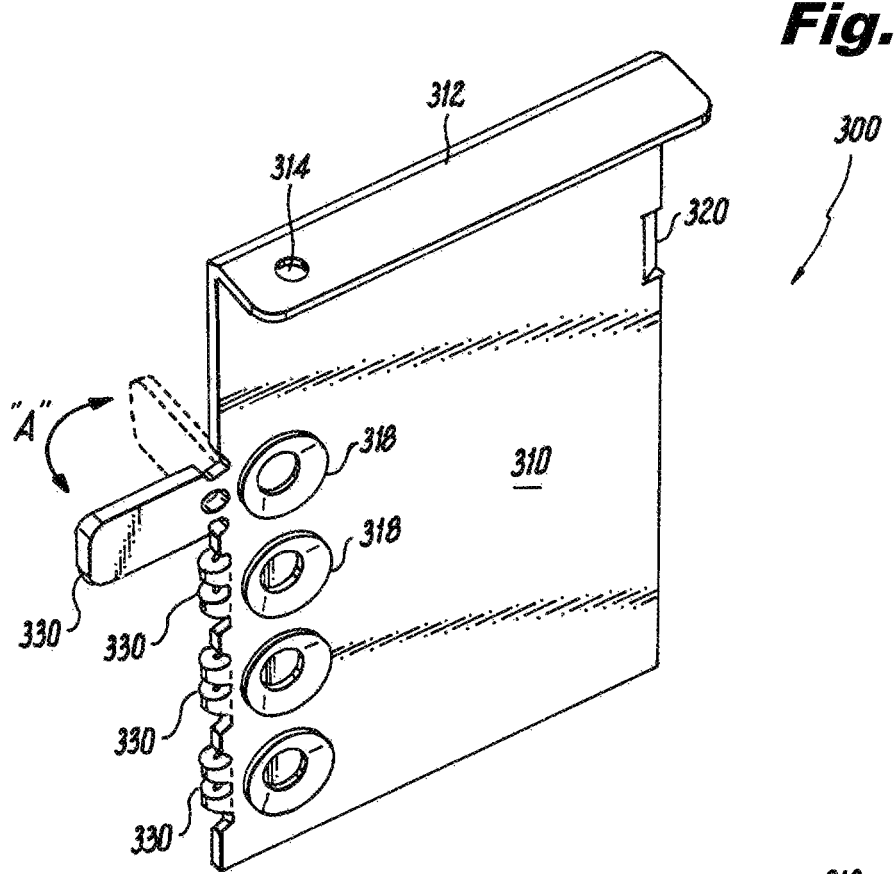
FIG. 18 is a perspective view of the opposite side of the box separator of FIG. 16 illustrating articulation of a break tab.
Figure 19:
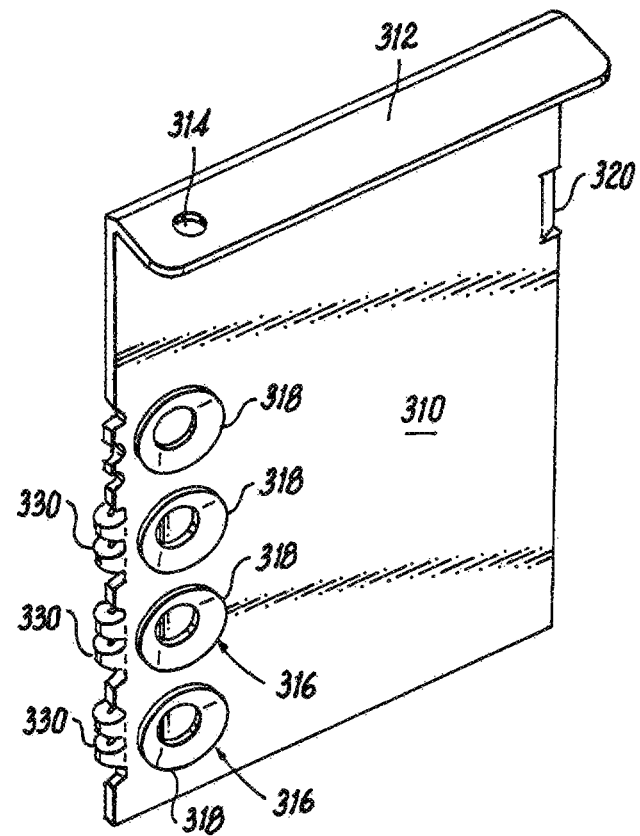
FIG. 19 is a perspective view of the box separator of FIG. 18, illustrating the break tab removed from the box separator.

Continuing to refer to FIGS. 16-19, the box separator 300 also includes one or more openings 316 with flanged edges 318 on each side of the plate to prevent potential damage to wires passing through the openings 316. The diameter of the one or more openings 316 may vary. For example, the diameter of the opening can be about 0.25 inch, 0.38 inch, etc. The diameter of the openings can be the same or they can be different, as one skilled in the art would readily appreciate. As shown in the figures, the openings 316 are positioned along an upper area of the plate 310. In this embodiment, each opening 316 in the plate 310 has a break tab 330 covering at least one side of the opening 316 as shown in FIGS. 16 and 17. If the plate 310 is a metal plate, the break tab 330 can be punched in the plate when formed, or the break tab can be secured to the plate using known methods including, for example, welding. If the plate is a plastic plate, the break tab 330 can be included in the plate during the injection molding process, or the break tab can be secured to the plate using known methods including, for example, sonic welding. Each break tab 330 is initially positioned to cover the opening so that wires cannot be passed through the opening. In order to pass a wire through an opening 316, the break tab 330 is pivoted upward and downward, as shown by arrow "A" in FIG. 18, one or more times until the break tab 330 breaks off from the plate 310, as seen in FIG. 19.

Figure 20:
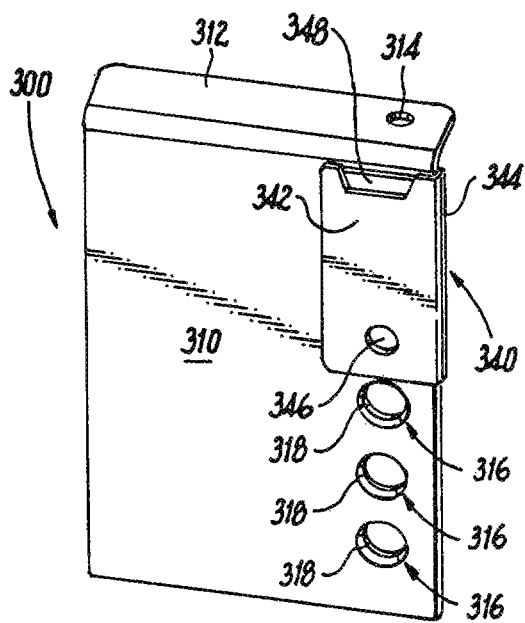
FIG. 20 is a perspective view of another exemplary embodiment of a box separator according to the present disclosure, illustrating multiple openings and a movable cover.
Figure 21:
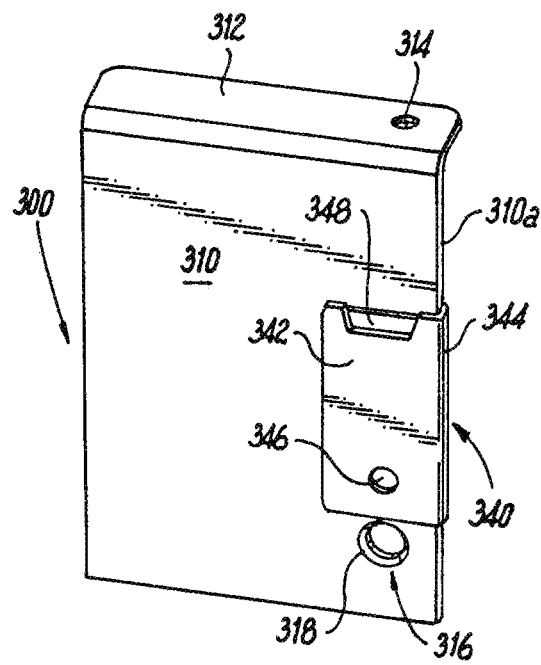
FIG. 21 is a perspective view of the box separator of FIG. 20, illustrating the movable cover over multiple openings.
Figure 22:
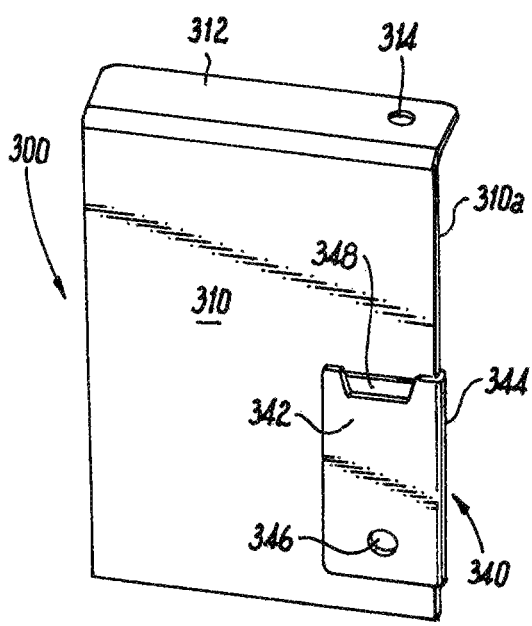
FIG. 22 is a perspective view of the box separator of FIG. 20, illustrating the movable cover over all openings.
Figure 23:
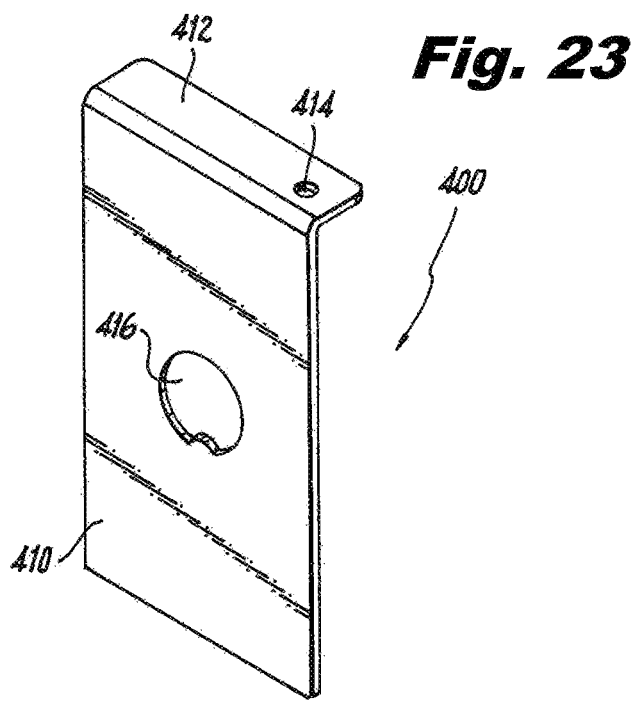
FIG. 23 is a perspective view of another exemplary embodiment of a box separator according to the present disclosure, illustrating a single knockout in the box separator.
Figure 24:
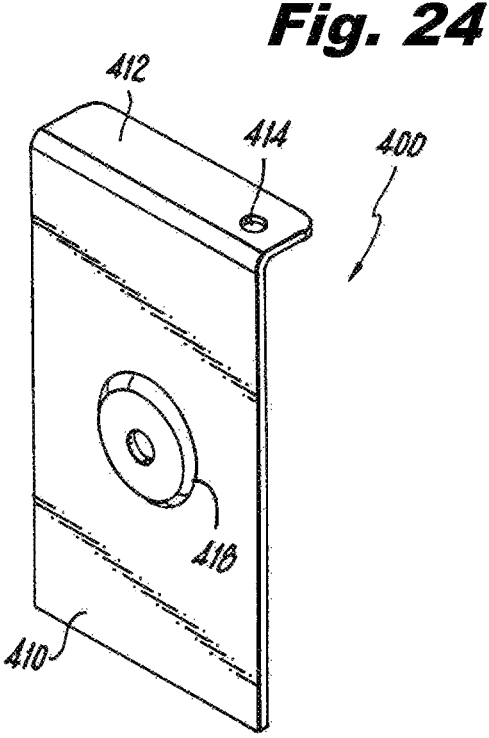
FIG. 24 is a perspective view of the box separator of FIG. 23, illustrating a grommet with a single wire opening inserted into an opening in the box separator where the single knockout was removed.
Figure 25:
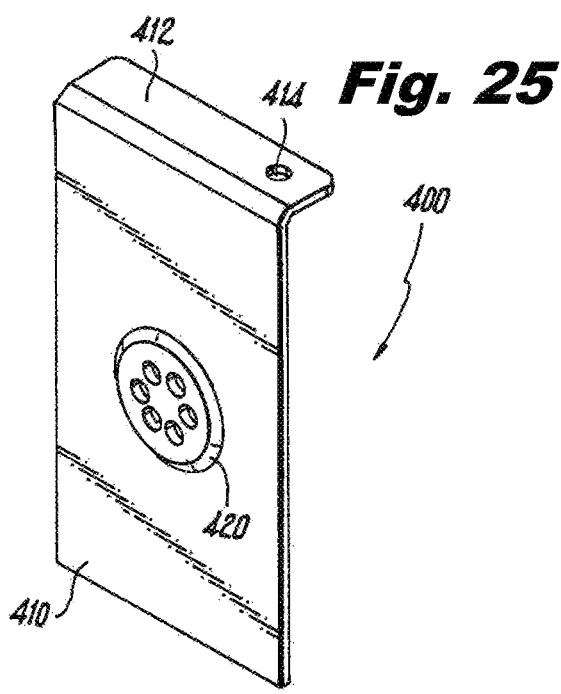
FIG. 25 is a perspective view of the box separator of FIG. 23, illustrating a grommet with multiple wire openings inserted into an opening in the box separator where the single knockout was removed.
Figure 26:
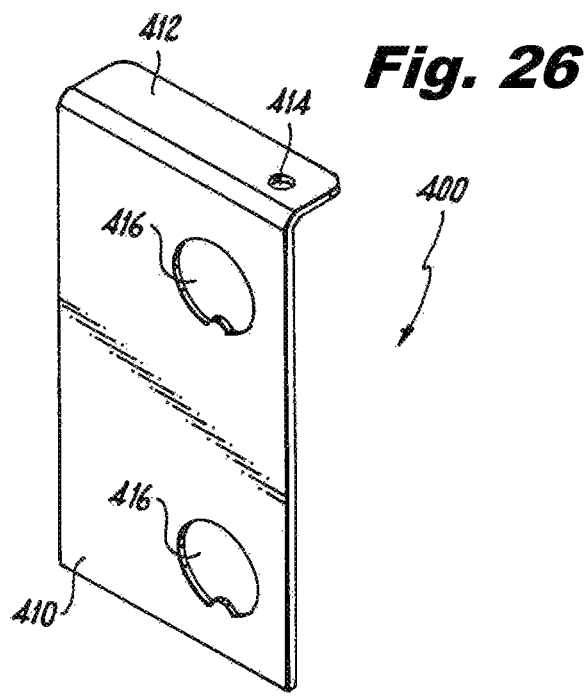
FIG. 26 is a perspective view of another exemplary embodiment of a box separator according to the present disclosure, illustrating two knockouts in the box separator.
Figure 27:
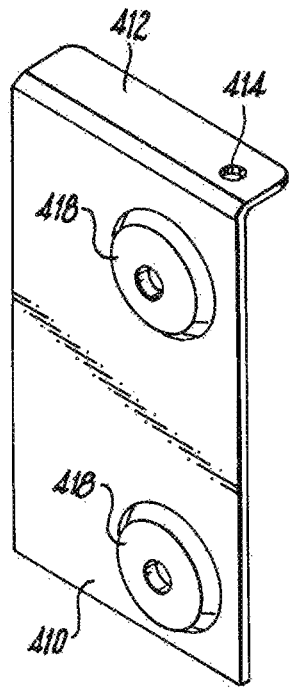
FIG. 27 is a perspective view of the box separator of FIG. 26, illustrating two grommets each with a single wire opening and inserted into an opening in the box separator where the knockouts were removed.
Figure 28:
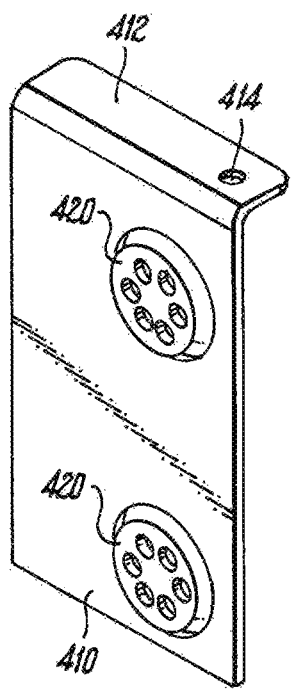
FIG. 28 is a perspective view of the box separator of FIG. 26, illustrating two grommets each with multiple wire openings and inserted into an opening in the box separator where the knockouts were removed.
Figure 29:
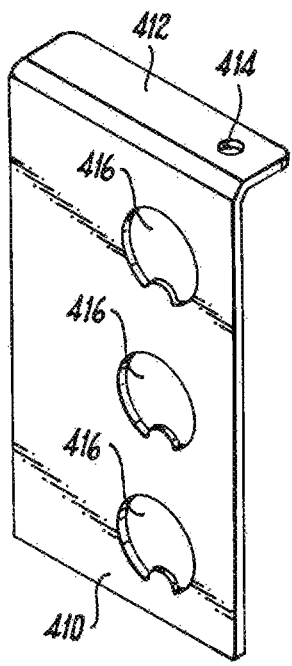
FIG. 29 is a perspective view of another exemplary embodiment of a box separator according to the present disclosure, illustrating three knockouts in the box separator.
Figure 30:
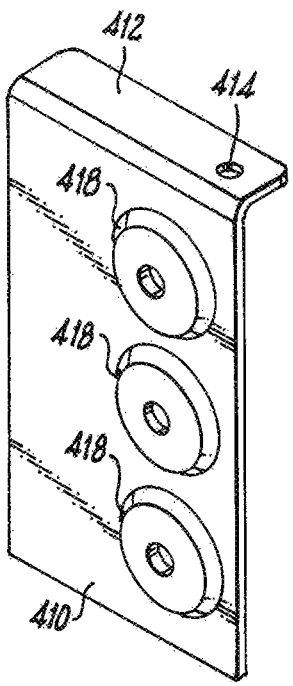
FIG. 30 is a perspective view of the box separator of FIG. 29, illustrating three grommets each with a single wire opening and inserted into an opening in the box separator where the knockouts were removed.
Figure 31:
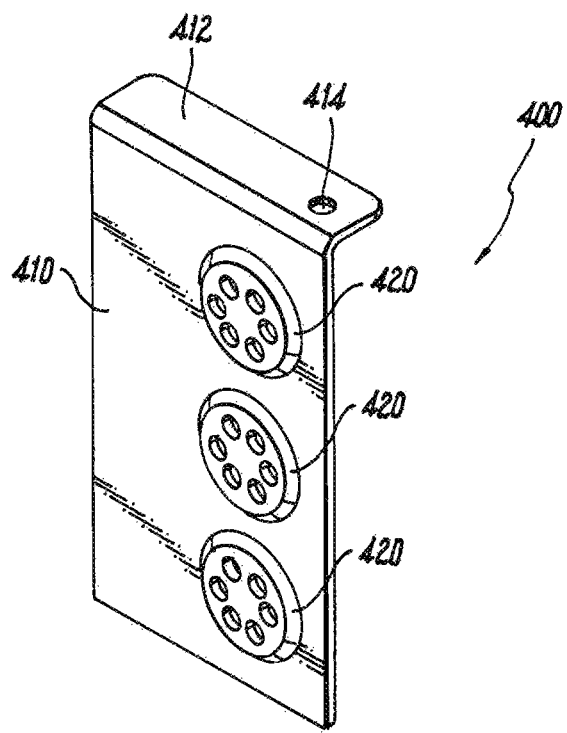
FIG. 31 is a perspective view of the box separator of FIG. 29, illustrating three grommets each with a multiple wire openings and inserted into an opening in the box separator where the knockouts were removed.

Referring to FIGS. 20-22, another exemplary embodiment of a box separator according to the present disclosure is shown. In this embodiment, the box separator 300 includes one or more openings 316, such as extruded round holes, as passageway through the box separator. Similar to the box separator embodiment of FIGS. 13-15, the box separator 300 of this configuration is a plate 310 having a mounting member 312, such as a mounting arm, extending at substantially a right angle from the plate 310 and along the width of the plate. The mounting member 312 includes one or more threaded or tapped mounting holes 314, and is used to facilitate the securing of the box separator 300 within the box housing 20, as described above.

Continuing to refer to FIGS. 20-22, the box separator 300 also includes one or more openings 316 with flanged edges 318 on each side of the plate to prevent potential damage to wires passing through the openings 316. As shown in the figures, the openings 316 are positioned along an upper area of the plate 310. In this embodiment, the plate 310 includes a cover 340 that is, for example, a U-shaped member having a pair of cover plates 342 (one on each side of the plate 310) and a connecting wall 344 between the pair of cover plates 342. One or both of the cover plates 342 include a projection 346 that projects toward the other cover plate 342 such that the projections can project into an opening formed between the cover plates 342 and the connecting wall 344. The cover 340 is positioned to straddle the upper surface 310a of the plate 310 so that projections 346 can extend into one of the openings 316 to movably secure the cover 340 to the plate 310 and to permit the cover 340 to slide along the upper surface 310a of the plate 310 so as to cover one or more of the openings 316 in the plate. To assist in sliding the cover 340 along the upper surface 310a of the plate 310, one or both of the cover plates 342 may include a hand tab 348 that permits a wire installer to manually slide the cover 340 along the upper surface of the plate. For example, in FIG. 20 the cover 340 is positioned adjacent the mounting member 312, and three openings 316 are exposed so that wires can be passed through the three openings. In FIG. 21, the cover 340 is moved away from the mounting member 312 so that the cover 340 is positioned over two of the three openings and wires can be passed through the one exposed opening. In FIG. 22, the cover 340 is moved further away from the mounting member 312 so that the cover 340 is positioned over all three openings, and no wires can be passed through box separator.

Referring to FIGS. 23-31, additional box separator embodiments are shown. Similar to the embodiments described above, the box separator 400 comprises a plate 410 having a mounting member 412, such as a mounting arm, extending at substantially a right angle from the plate 410 and along the length of the plate. The mounting member 412 includes one or more threaded or tapped mounting holes 414 used to facilitate the securing of the box separator 400 within the box housing 20, as described above. In the embodiments shown, the box separator 400 includes one or more knock-outs 416 where flexible grommets, e.g., rubber or plastic grommets, can be inserted into the opening created in the box separator 400 when a knock-out is removed. For example, in the embodiment of FIGS. 23-25, the box separator 400 includes one knock-out 416 (FIG. 23) and a grommet 418 (FIG. 24) having a single opening for passing wire through the box separator 400, or a grommet 420 (FIG. 25) having a plurality of openings for passing wire through the box separator 400. As another example, in the embodiment of FIGS. 26-28, the box separator 400 includes two knock-outs 416 (FIG. 26) and two grommets 418 (FIG. 27) each having a single opening for passing wire through the box separator 400, or two grommets 420 (FIG. 28) each having a plurality of openings for passing wire through the box separator 400. As another example, in the embodiment of FIGS. 29-31, the box separator 400 includes three knock-outs 416 (FIG. 29) and three grommets 418 (FIG. 30) each having a single opening for passing wire through the box separator 400, or three grommets 420 (FIG. 31) each having a plurality of openings for passing wire through the box separator 400. The size of the knock-outs 416 may vary. One skilled in the art would readily appreciate the knock-outs can be, for example, ⅜ inch, ½ inch, ¾ inch, or greater in size.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical box assembly comprising:
a box housing having four sides and a bottom; and
a box separator secured within the box housing and configured to create at least two isolated compartments within the box housing, wherein the box separator comprises:
a plate having a first end and an opposing second end and including a first wire passage;
a partial plate spaced from the plate and having a first end and an opposing second end; and
a connecting wall extending between the plate and partial plate and connecting the first end of the plate with the first end of the partial plate;
wherein the plate, partial plate and connecting wall form a wire passage channel extending between the plate and partial plate.

2. The electrical box assembly according to claim 1, wherein the connecting wall of the box separator is directly connected to one of the four sides of the box housing.

3. The electrical box assembly according to claim 1, wherein the plate extends between two of the four sides of the box housing, and wherein the two of the four sides are opposite sides of the box housing.

4. The electrical box assembly according to claim 1, wherein the first end of the partial plate extends from one of the four sides of the box housing, and wherein the second end of the partial plate is a free end.

5. The electrical box assembly according to claim 4, wherein the free end of the partial plate includes a curved flange.

6. An electrical box assembly comprising:
a box housing having four sides and a bottom;
a first box separator secured within the box housing and configured to create at least two isolated compartments within the box housing, wherein the first box separator comprises a first plate having a first wire passage, a second partial plate, and a connecting wall between the first plate and the second partial plate, wherein the first plate, second partial plate and connecting wall form a wire passage channel;
a box extension ring mountable to the box housing and having four sides; and a second box separator secured within the box extension ring and configured to create at least two isolated compartments within the box extension ring, wherein the second box separator comprises a first plate having a first wire passage, a second partial plate, and a connecting wall between the first plate and the second partial plate, and wherein the first plate, second partial plate and connecting wall form a wire passage channel.

7. An electrical box assembly comprising:
a box housing having four sides and a bottom; and
a box separator secured within the box housing and configured to create at least two isolated compartments within the box housing, wherein the box separator comprises a plate having a mounting member used to secure the box separator to the box housing and at least one opening within the plate forming a passage into each compartment;
wherein the at least one opening within the plate comprises an extruded opening having smooth surface flanges on each side of the plate.

8. The electrical box assembly according to claim 7, wherein the mounting member comprises a mounting tab.

9. The electrical box assembly according to claim 7, wherein the at least one opening within the plate comprises a grommet having a solid core that can be knocked-out.

10. The electrical box assembly according to claim 7, wherein the at least one opening within the plate comprises a grommet having at least one flexible flap.

11. The electrical box assembly according to claim 7, wherein the plate includes at least one break tab covering the at least one opening.

12. The electrical box assembly according to claim 7, wherein the plate includes a cover movable along an edge of the plate such that the cover can be moved to cover the at least one opening.

13. The electrical box assembly according to claim 7, wherein the at least one opening within the plate comprises a knock-out that can be removed from the plate and a flexible grommet inserted into the opening.

14. The electrical box assembly according to claim 7, wherein the plate further comprises at least one break tab used to adjust the length of the plate.

15. An electrical box assembly comprising:
a box housing having four sides and a bottom;
a first box separator secured within the box housing and configured to create at least two isolated compartments within the box housing, wherein the first box separator comprises a plate having a mounting member used to secure the first box separator to the box housing and at least one opening within the plate forming a passage into each compartment;
a box extension ring mountable to the box housing and having four sides; and
a second box separator secured within the box extension ring and configured to create at least two isolated compartments within the box extension ring, wherein the second box separator comprises a plate having a mounting member used to secure the second box separator to the box extension ring and at least one opening within the plate forming a passage into each compartment;
wherein the at least one opening within the plate of the first box separator or the second box separator comprises an extruded opening having smooth surface flanges on each side of the plate.

16. The electrical box assembly according to claim 15, wherein the mounting member of the first box separator or the second box separator comprises a mounting tab.

17. The electrical box assembly according to claim 15, wherein the at least one opening within the plate of the first box separator or the second box separator comprises a grommet having a solid core that can be knocked-out.

18. The electrical box assembly according to claim 15, wherein the at least one opening within the plate of the first box separator or the second box separator comprises a grommet having at least one flexible flap.

19. The electrical box assembly according to claim 15, wherein the plate, and the plate of the first box separator or the second box separator includes at least one break tab covering the at least one opening.

20. The electrical box assembly according to claim 15, wherein the plate of the first box separator or the second box separator includes a cover movable along an edge of the plate such that the cover can be moved to cover the at least one opening.

21. The electrical box assembly according to claim 15, wherein the at least one opening within the plate of the first box separator or the second box separator comprises a knock-out that can be removed from the plate and a flexible grommet inserted into the opening.

22. The electrical box assembly according to claim 15, wherein the plate of the first box separator or the second box separator further comprises at least one break tab used to adjust the length of the plate.

\* \* \* \* \*